(12) United States Patent
Gekat

(10) Patent No.: US 8,085,181 B2
(45) Date of Patent: Dec. 27, 2011

(54) POLARIZATION-MODULATED TRANSMITTER FOR A WEATHER RADAR

(76) Inventor: Frank Gekat, Rösrath (DE)

( * ) Notice: Subject to any disclaimer, the term of this patent is extended or adjusted under 35 U.S.C. 154(b) by 388 days.

(21) Appl. No.: 12/305,330

(22) PCT Filed: Jun. 22, 2007

(86) PCT No.: PCT/EP2007/005507
§ 371 (c)(1),
(2), (4) Date: Dec. 17, 2008

(87) PCT Pub. No.: WO2007/147610
PCT Pub. Date: Dec. 27, 2007

(65) Prior Publication Data
US 2009/0174596 A1    Jul. 9, 2009

(30) Foreign Application Priority Data
Jun. 23, 2006  (DE) .......................... 10 2006 029 317

(51) Int. Cl.
G01S 13/95 (2006.01)
(52) U.S. Cl. ..................................... 342/26 R; 342/188
(58) Field of Classification Search ................ 342/26 R, 342/26 A–26 D, 188, 175
See application file for complete search history.

(56) References Cited

U.S. PATENT DOCUMENTS

| | | | |
|---|---|---|---|
| 2,273,161 A | 2/1942 | Usselman | |
| 3,478,362 A | 11/1969 | Ricardi | |
| 3,500,460 A | 3/1970 | Jones | |
| 4,323,898 A | 4/1982 | Barnes | |
| 5,344,099 A | 9/1994 | Pittman | |
| 6,121,920 A | 9/2000 | Barrett | |
| 7,355,546 B2 * | 4/2008 | Randall | 342/26 R |
| 7,439,899 B2 * | 10/2008 | Stagliano et al. | 342/26 R |
| 7,623,064 B2 * | 11/2009 | Calderbank et al. | 342/188 |
| 7,880,665 B1 * | 2/2011 | Knight | 342/26 R |
| 2004/0056791 A1 | 3/2004 | Alford | |
| 2009/0174596 A1 * | 7/2009 | Gekat | 342/26 R |

FOREIGN PATENT DOCUMENTS

| | | | |
|---|---|---|---|
| EP | 0543509 A2 | | 5/1993 |
| EP | 0703464 A2 | | 3/1996 |
| EP | 2019326 A2 | * | 1/2009 |
| EP | 2051104 A1 | * | 4/2009 |
| WO | WO 2007147610 A1 | * | 12/2007 |

OTHER PUBLICATIONS

Zahrai, A., et al., "Implementation of polarimetric capability for the WSR-88D (NEXRAD) radar", Aerospace and Electronics Conference, p. 346-351, 1997.

* cited by examiner

*Primary Examiner* — John Sotomayor
(74) *Attorney, Agent, or Firm* — Kilpatrick Townsend & Stockton LLP

(57) ABSTRACT

Polarization modulated transmitter, in particular for a weather radar, with at least two signal paths (3, 4) to which a radio frequency signal can be fed, and which are connected to a coupler (8), and with a phase modulation of the signal to be emitted via the antenna (1), it being possible to feed the same radio frequency signal to the at least two signal paths (3, 4) respectively having at least one transmit amplifier (5, 6), and a polarization modulator (7) is arranged for the phase modulation in one of the at least two signal paths (3, 4) in such a way that a radio frequency signal can first be phase modulated and then amplified.

12 Claims, 8 Drawing Sheets

POLARIZATION-MODULATED TRANSMITTER FOR A WEATHER RADAR

The invention relates to a polarization modulated transmitter, in particular of a weather radar, according to the preamble of claim 1.

In the acquisition of weather data, weather radars are used for weather observation, for example in the vicinity of airports. The weather radars emit electromagnetic waves, and receive again the electromagnetic waves back scattered, inter alia, on precipitation particles, in order to evaluate said waves. For example, electromagnetic waves are scattered on relatively large raindrops because of their oval shape such that the horizontal field component is reflected more strongly than the vertical field component. Many weather radars emit an electromagnetic wave that has a single field component, that is to say the electromagnetic wave is "singly" linearly polarized. In order to emit a suitable electromagnetic wave for the evaluation in this respect, said wave is mostly horizontally polarized.

However, it has emerged that "singly" linearly polarized weather radars have substantial disadvantages. The accuracy of measurement of the rainfall rate is inadequate for many applications. The attenuation to which the wave is exposed during its propagation through rain cannot be taken into account when calculating the rainfall rate. It is impossible to classify the precipitation particles.

In order to increase the accuracy of measurement of the rainfall rate so as to detect the attenuation of the rain by the precipitation, and to be able to undertake a classification of the precipitation particles, for example with the aid of the particle size distribution, use is made of "polarimetric" weather radars that emit electromagnetic waves in two field components polarized orthogonally to one another. For the purpose of evaluation, the backscattered, received pulse is decomposed into the two field components and respectively fed to a receiver.

In the case of simultaneous (dual) polarization, each emitted pulse includes both field components, which are polarized orthogonally to one another. The pulse emitted by the antenna is provided by a transmitter whose power is split between two channels, one for each field component.

Owing to the splitting of the transmit power of the transmitter between two channels in the case of simultaneous polarization, the transmit power available for each of the two channels is halved. In addition, the linear depolarization of the received signal cannot be measured, since this presupposes that a linearly polarized signal is emitted and the field components polarized orthogonally to one another are measured. This is not directly possible in the case of simultaneous polarization.

In the case of polarization switching, a single transmitter is switched to and fro between the two channels for the two field components polarized orthogonally to one another. The transmitter gives the entire power to one channel, which is fed to a polarization port of the antenna, switching being done in an alternating fashion between the two channels from pulse to pulse or after a previously defined number of pulses. A ferrite switch or a mechanical switch, for example, serves as high power switch. Ferrite switches are very expensive and vulnerable. Because of the high switching speed, the mechanical switches must be synchronized with the pulse repetition frequency of the weather radar, and generally function only when a number of pulses are emitted between successive switchings.

It is written in A. Zahrai and Dr. Dusan Zrnic, "Implementation of polarimetric capability for the WSR-88D (NEXRAD) Radar", American Meteorological Society, 13th Conference on IIPS, 1997, page 284, that it is possible to provide a mechanical high power switch that can be used to switch from the splitting of the transmit signal for the operating mode of simultaneous polarization to linear polarization.

A disadvantage here is that the mechanical high power switch does not operate in real time and is therefore very slow. It is difficult to correlate between the rotation rate of the weather radar antenna and the transmitter. Schroth, Chandra and Meischner, "A C-Band Coherent Polarimetric Radar for Propagation and Cloud Physics Research", American Meteorological Society, 1988, page 803 describes a weather radar in the case of which a polarization switching network based on phase modulation can be used to switch between the operating modes of simultaneous polarization and polarization switching. Two signal paths are present which respectively have a device for modulating electromagnetic pulses and operate independently of one another. It is difficult to correlate the mutually independent devices for generating electromagnetic pulses. In addition, phase shifting is carried out on the signals with a high power level, and this complicates the design.

There is known from Bringi, V. N., Chandrasekar, V., "Polarimetric Doppler Weather Radar", Cambridge University Press, Cambridge, UK, 2001, page 312, FIG. 6.11, a polarization modulated transmitter, in particular for a weather radar, in the case of which there is provided for each polarization component a generator for electromagnetic pulses that are emitted and received via a common antenna. Since the two transmit signals are generated by different transmit amplifiers, they are so strongly decorrelated with reference to their waveform, that a precise measurement is no longer possible. Furthermore, the emission of alternating polarizations requires the respectively unnecessary transmitters to be switched off.

It is therefore an object of the invention to provide a transmitter according to the preamble of claim 1 that is of simple design, permits rapid switching between the operational modes of simultaneous and switched polarization, has a good correlation of the polarized pulses, utilizes the available transmit power as efficiently as possible, and can be implemented cost-effectively.

This object is achieved by the features of claim 1.

This provides a polarization modulated transmitter, in particular for a weather radar, in which a radio frequency signal is connected to an antenna of the weather radar via a circuit with at least two signal paths, and the pulses are split between the at least two signal paths. At least one transmit amplifier is respectively arranged in the signal paths. A polarization modulator is provided in at least one of the signal paths upstream of the corresponding transmit amplifier of the signal path, and so the polarization modulator need only modulate the signal with low power. The electromagnetic pulses are staggered with the aid of a coupler, coupling the signal paths, downstream of the transmit amplifiers, and then fed to the antenna. Owing to the combination of the polarization modulator arranged upstream of the coupler in one signal path, the signal required for the desired operational mode is generated in the two signal paths without the need to use complicated circuits or rapid response high power switches, or to use a polarization of a signal at a high level. The simple design of the transmitter leads to a modulation of the polarization in conjunction with low power levels and a high correlation on the basis of the additive superposition of the two transmit amplifier signals present at the inputs of the coupler, and so the transmitter can be implemented much more easily and cost effectively. The signal of each of the signal paths can then be fed in an appropriately polarized fashion to the antenna.

The radio frequency signal can preferably be fed to the signal paths by a pulse modulator. This enables a simple way of generating pulses.

As an element that is easy to implement, the polarization modulator can preferably be a phase shifter that is designed as a rapidly switching electronic phase shifter or a microelectromechanical ("MEMS") phase shifter.

Depending on the type of line, for a further simpler design the coupler is preferably designed as a magic T or hybrid (quadrature hybrid) for hollow conductors, as a branch-line coupler or a hybrid ring coupler for strip conductors, and as a branch-line coupler for coaxial lines.

In order to configure the transmit amplifiers simply, the latter can be configured as a klystron, crossed field amplifier, traveling field tube, grid-controlled tube or transistor amplifier. These transmit amplifiers can be used for simple pulse modulation by virtue of the fact that the voltage supply can be modulated. In the case of the traveling field tube, the grid-controlled tube or the transistor amplifier, pulse modulation is possible via an electrode configured as a grid and with the aid of which the electron beam can be switched on and off.

It is preferred to provide in the signal paths downstream of the transmit amplifiers one-way attenuators, that is to say isolators, which protect the transmit amplifiers should the isolation by the coupler be insufficient.

It is preferably possible for the signal of the signal paths to be decoupled to receivers that are connected to a processor that controls at least one predistorter, arranged upstream of the transmit amplifier, with regard to the predistortion of the signal. This yields a good quality of the transmit signals, and so the signals fed into the coupler exhibit a high correlation. Each transmit signal can, as test signal, be decoupled, mixed and fed to the processor, which calculates the optimum predistortion and controls an appropriate predistorter in one of the signal paths. The signals of both signal paths can be predistorted, or a signal of one signal path serves as reference, and only the signal of the other signal path is distorted. It is also possible for the signals of the two signal paths additionally, or else only, to be decoupled downstream of the coupler, in order to compensate any possible asymmetries of the coupler arising from the predistortion.

The decoupled signals of the two signal paths can preferably be correlated by mixing. Depending on mixer type, it is also possible, furthermore, to use a calibrated phase shifter to delay one of the two signals of the signal paths, in order to maximize the output signal of the mixer.

A correlation can preferably also be performed via an I/Q demodulator that supplies phase and amplitude information via a complex phasor as output signal. The I/Q demodulator is also preferably calibrated.

Further refinements of the invention are to be gathered from the subclaims and the following description.

The invention is explained in more detail below with the aid of the exemplary embodiment illustrated in the attached diagrams, in which.

Figure 1:
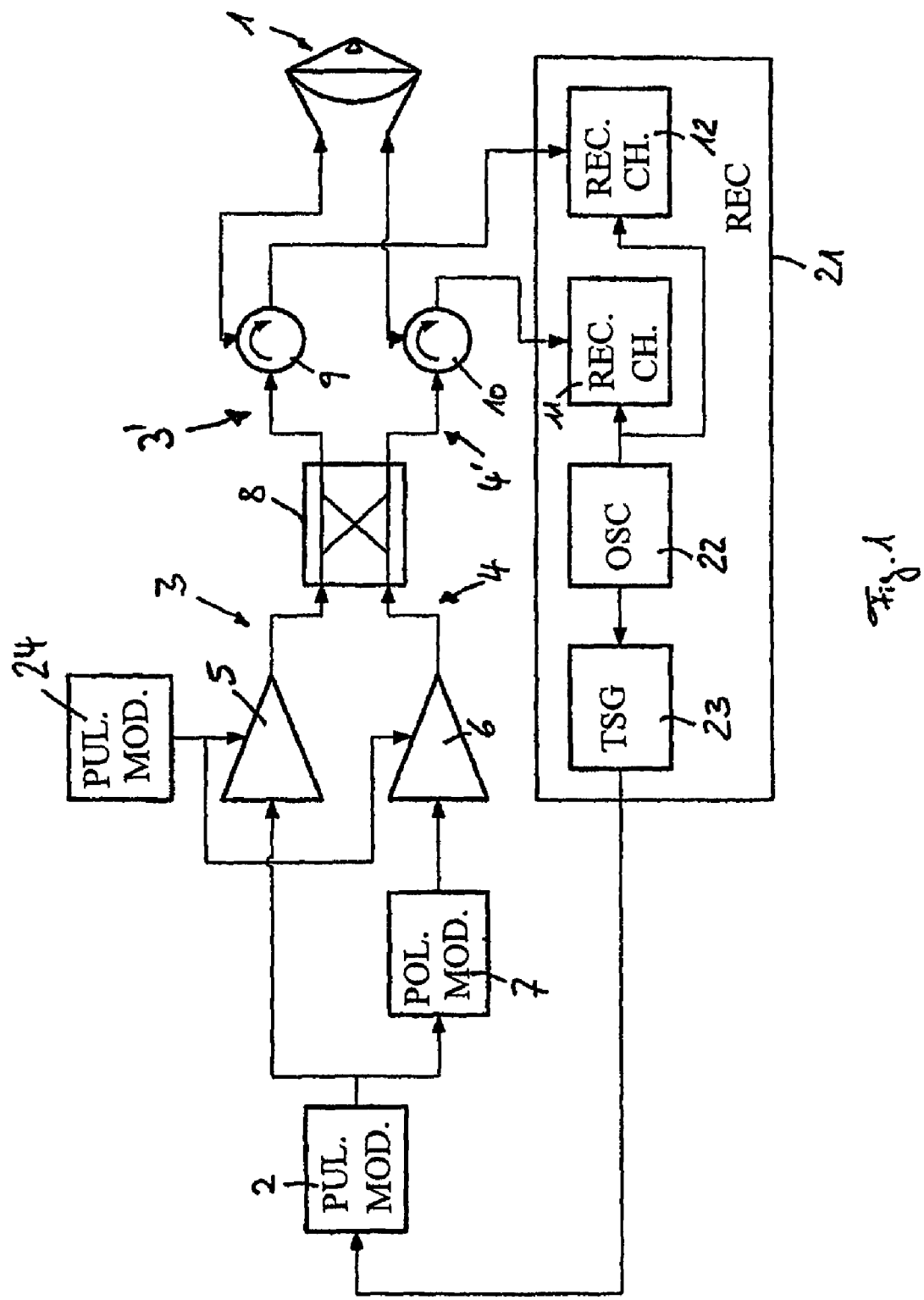
FIG. 1 shows a schematic of a weather radar with a first exemplary embodiment of a transmitter.

FIG. 1 shows a weather radar with a first exemplary embodiment of a polarization modulated transmitter. The transmitter has at least two signal paths 3, 4 to which the same radio frequency signal can be fed, preferably by a pulse modulator 2. Each of the signal paths 3, 4 has at least one transmit amplifier 5, 6. The signal paths 3, 4 are coupled via a coupler 8 such that the pulses incoming at the coupler 8 are staggered. The at least two signal paths 3, 4 are provided for a different polarization of the signals between the antenna 1, which emits the signal, and the pulse modulator 2. A polarization modulator 7 is arranged in the signal path 4 upstream of the transmit amplifier 6, that is to say arranged upstream of the transmit amplifier 6 in the pulse propagation direction. The pulses staggered by the coupler 8 can be fed to circulators 9, 10.

The two signal paths 3', 4' downstream of the coupler 8 serve the polarization of the emitted wave by the antenna 1. The signal paths 3', 4' can respectively be used to feed a pulse to the antenna 1 for the emission of a horizontally or vertically polarized wave. The exciter of the antenna 1 therefore has, as it were, two ports such that the polarization comes about with the emission of the signal, and the polarization specifies the position of the electric field component relative to the ground. The circulators 9, 10 serve the purpose of separating a transmitted or emitted signal from a received signal.

In addition, FIG. 1 provides a pulse modulation by a pulse modulator 24 in the signal paths 3, 4 at the transmit amplifiers 5, 6. Electromagnetic pulses are also received via the antenna 1 and led, via the circulator 9, 10, to a receiver 21 that has two receive channels 11, 12 for the received electromagnetic pulses. The received electromagnetic pulses are evaluated as a function of the emitted signal or pulse. In this case, one of the receive channels 11, 12 evaluates the vertically polarized component and the other receive channel 11, 12 evaluates the horizontally polarized component. The receiver also has at least one oscillator 22 that is connected to the receive channels 11, 12, and an apparatus 23 for generating transmit signals.

If only one oscillator 22 is provided, the signal of the oscillator 22 is used for transmission and reception. The carrier is completely cleared in the receiver 21 by the mixing, and so the information, the so-called baseband, is immediately available. Such a receiver is called a homodyne receiver.

In the case of a heterodyne receiver, a signal is firstly converted to an intermediate frequency and then into the baseband, this requiring at least two oscillators 22, the so-called stable local oscillator STALO and the coherent oscillator COHO. With regard to the number of conversions, it is possible to distinguish between a single conversion receiver, in the case of which only one intermediate frequency is used and only two oscillators are required, and a dual conversion receiver that operates with two intermediate frequencies and requires three oscillators.

In the case of the receiver 21, it is also possible to use a digital receiver (digital backend) in which the intermediate frequency is digitized in an analog-to-digital converter and further processing takes place numerically. In this case, the clock of the analog-to-digital converter constitutes a further oscillator, and so two analog converters and the clock of the analog-to-digital converter are a digital dual conversion receiver.

In the case of the apparatus 23 for generating transmit signals, the oscillators 22 are mixed such that a signal with the transmit frequency is generated and is fed to the pulse modulator 2.

Alongside the demonstrated direct modulation in the apparatus 23 for generating transmit signals, a radio frequency signal fed to the two signal paths 3, 4 in FIG. 1 via the pulse modulator 2 can also be modulated in mixers such that the finished mixed signal is already modulated. Furthermore, the radio frequency pulse modulation can be carried out by generating a high mixing intermediate frequency signal with the aid of a digital-to-analog converter, the intermediate frequency signal being pulse modulated. A combination of said types of radio frequency pulse modulation is likewise possible.

It is also possible to carry out a pulse modulation of the transmitter, it being possible to modulate the power supply of a transmit tube or a transmit transistor. The transmit tube can also have an electrode, which is mostly configured as a grid, via which the electron beam can be switched on and off. It is also possible by analogy therewith to switch a transmit transistor on and off by modulating its gate and its space, respectively.

Figure 2:
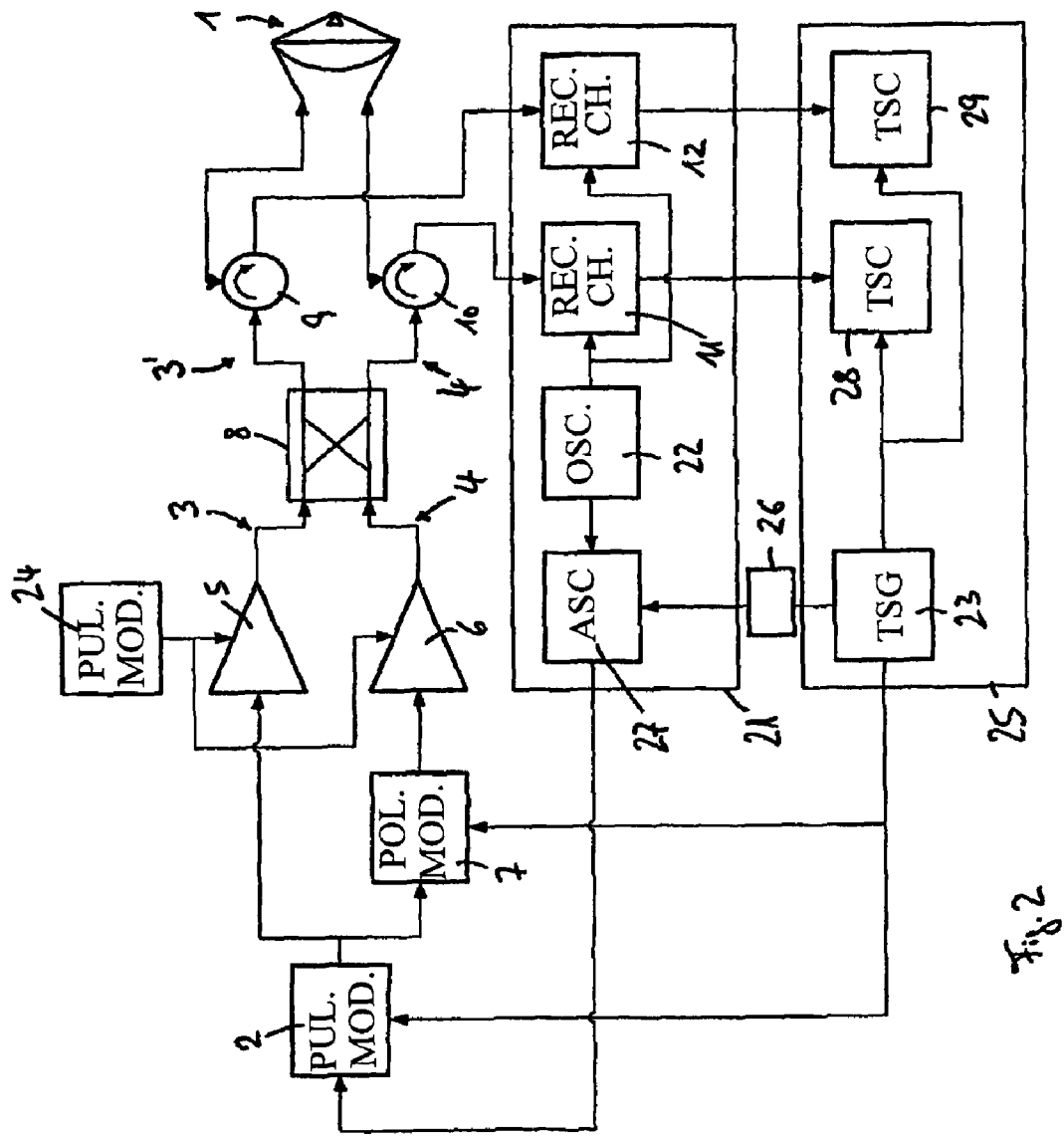
FIG. 2 shows a schematic of a pulse compression radar with the transmitter in accordance with FIG. 1.

The transmit pulse is modulated in the case of a pulse compression radar illustrated schematically in FIG. 2. The modulation can be a phase or a frequency modulation. For example, a frequency ramp is possible for which the transmit frequency starts at the beginning of the pulse at a low frequency and increases linearly during the pulse (linear frequency modulation). The design of the transmitter of the radar corresponds to that from FIG. 1. As distinguished from FIG. 1, in a signal processor 25 a transmit signal is generated in an apparatus 23 for generating transmit signals and is fed via an analog-to-digital converter 26 into an analog step-up conversion 27 of the receiver 21, which raises the transmit signal to the transmit frequency. Instead of using an analog-to-digital converter 26, it is also possible to use a digital synthesizer to generate the transmit signal or to feed it into the analog step-up conversion 27.

The signal received via the antenna 1 is fed to the signal processor 25 for evaluation via the two receive channels 11, 12, a transmit signal compression means 28, 29 being provided in the signal processor 25 for each receive channel 11, 12. The transmit signal compression means 28, 29 is, moreover, connected to the apparatus 23 for generating transmit signals, and respectively receives the transmit signal from the latter. The described modulation of the transmit signal enables the signal processor 25 to assign the signal received at a specific instant uniquely to a space cell. Moreover, all the components of the transmit signal which passes the space cell are coherently integrated, the sensitivity of the radar thereby being substantially raised.

In the case of the described polarization modulated pulse compression radar, it is conceivable to modulate the polarization not only from pulse to pulse, but also during the pulse in a fashion synchronous with the phase or frequency modulation of the pulse, in order thus to acquire different parameters as early as within one transmit/receive sequence, rather than only after a number of transmit/receive sequences.

Figure 3:
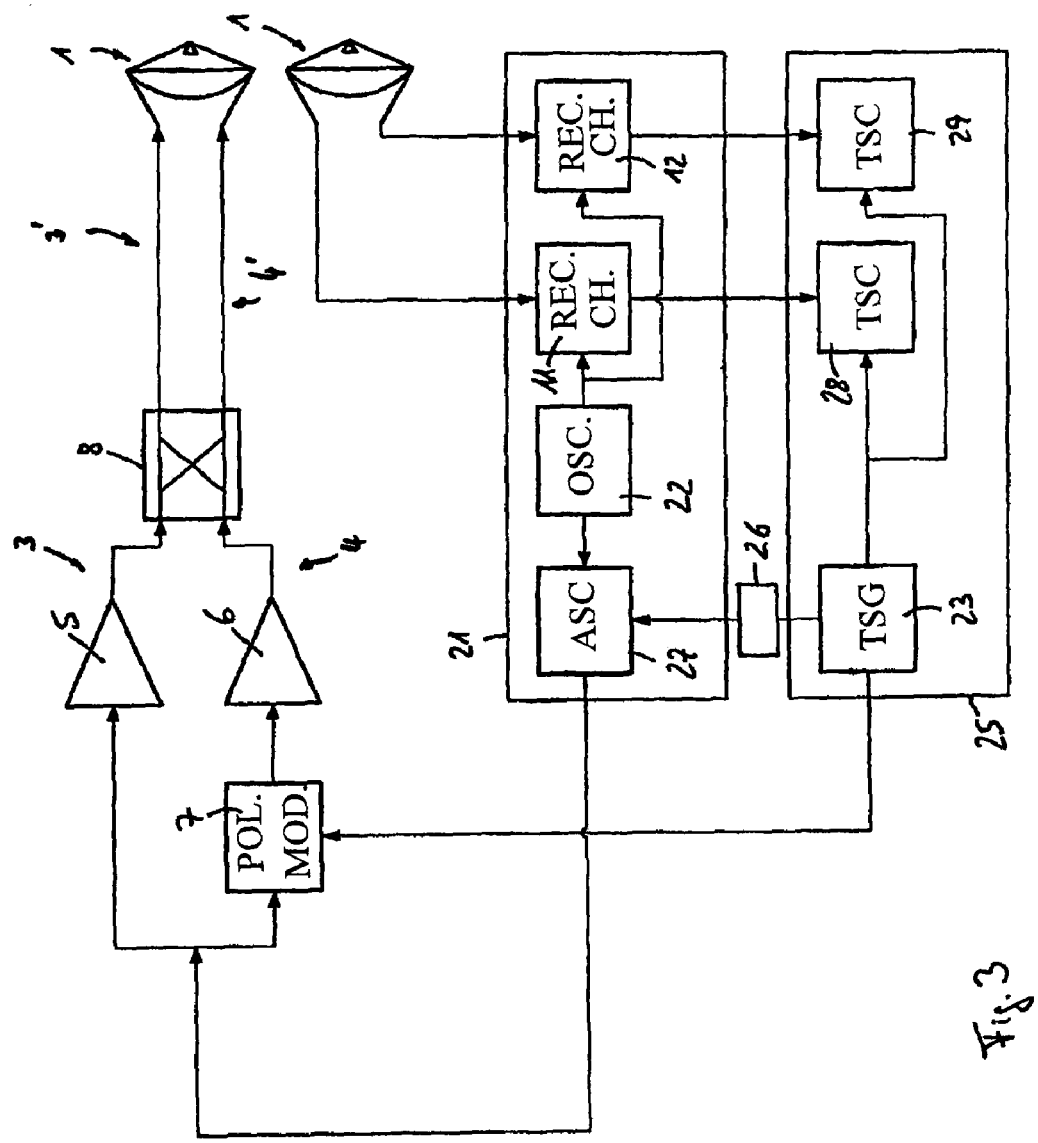
FIG. 3 shows a schematic of a frequency modulated continuous wave radar with the transmitter in accordance with FIG. 1.

A variant of the pulse compression radar according to FIG. 2 is the frequency modulated continuous wave (FMCW) radar illustrated schematically in FIG. 3. The transmit pulse modulator and/or the RF pulse modulator are omitted in the FMCW radar. The transmitter permanently emits a repeating frequency ramp. Since the transmitter operates permanently, no use is made of circulators for decoupling transmit signal and receive signal. Instead of this, an FMCW radar operates with two antennas 1, one being used for transmission, and the other for reception.

It is also conceivable here for the polarization to be switched not only from frequency ramp to frequency ramp, but also during a ramp.

A combination of the radio frequency pulse modulation and the pulse modulation of the transmitter is likewise possible.

Figure 4:
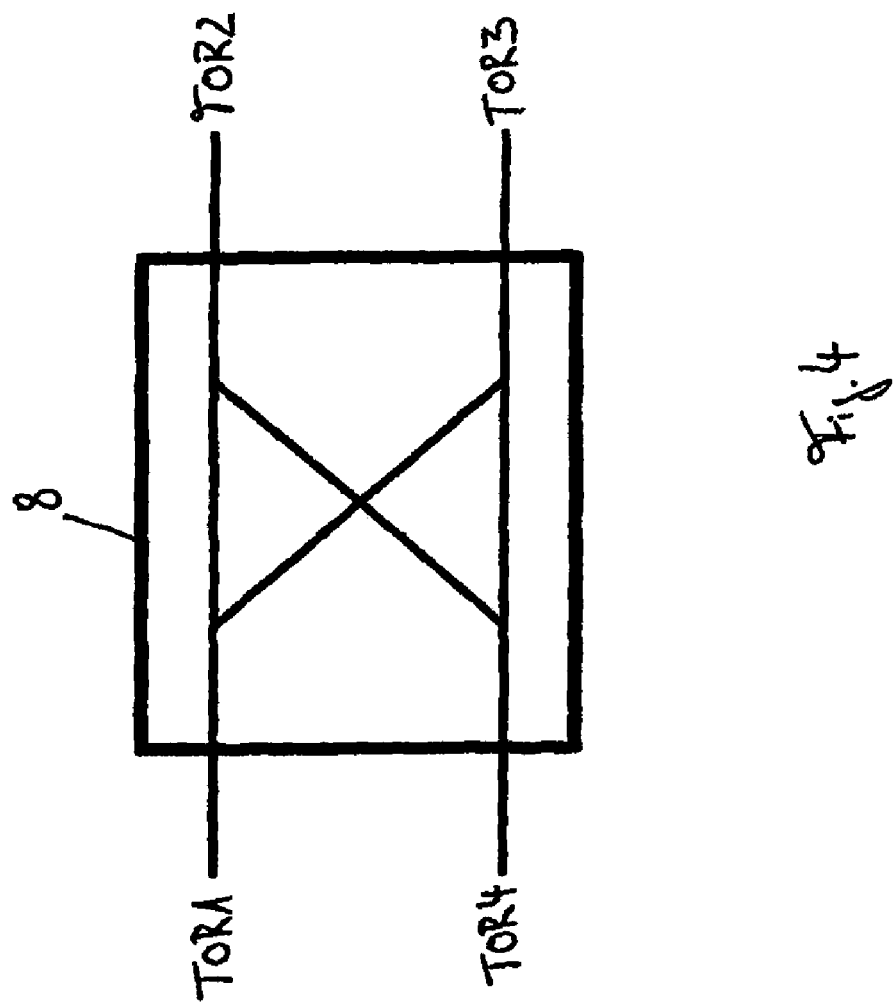
FIG. 4 shows a schematic of a coupler from FIGS. 1, 2 and 3.

The coupler 8 from FIG. 1 is illustrated in more detail in FIG. 4 with the ports TOR1, TOR2, TOR3, TOR4. The port TOR1 is the input port of the coupler 8, and is connected to the transmit amplifier 5 in the signal path 3. The port TOR4 is the input port of the coupler 8 and is connected to the transmit amplifier 6 in the signal path 4. The port TOR2 is the output port of the coupler 8 and is connected to the circulator 9. The port TOR3 is the output port of the coupler 8 and is connected to the circulator 10. In the exemplary embodiment illustrated in FIG. 1, the amplitude of the output signals at the ports TOR2 and TOR3 can be set by setting the phase angle of the signal at the port TOR3 with reference to the phase of the signal at the port TOR1 in conjunction with the same amplitude of the signal arriving at the ports TOR1 and TOR4.

For example, the amplitudes at the port TOR2 and at the port TOR3 can be destructively superposed such that the total power of the two input signals at the port TOR2 is output. The total power is then fed in the signal path 3 to the circulator 9 which, for example, polarizes the signal horizontally, such that a horizontally polarized wave can be fed to the antenna 1.

In the same way, the total power can be applied to port TOR3. The total power is then fed in the signal path 5 to the circulator 10, which polarizes the signal vertically, for example, such that a vertically polarized wave can be fed to the antenna 1.

The power can also be split uniformly between the ports TOR2 and TOR3 such that both a vertically polarized wave and a horizontally polarized wave can be fed simultaneously to the antenna 1 via the circulators 9, 10.

The operational modes of simultaneous polarization and polarization switching can be implemented by switching the phase shifter 7.

The design of the coupler depends on the selected type of conduction. In the case of wave conductors, it is possible, for example, to use a magic T or a quadrature hybrid. In the case of strip conductors, it is possible, for example, to use a branch-line coupler or a hybrid ring coupler. In the case of coaxial lines, it is possible, however, to use a branch-line coupler.

Mathematically, the coupler 8 can be described with reference to the example of the quadrature hybrid coupler illustrated in FIG. 4 by means of its scattering matrix. Waves that run into the coupler 8 are denoted by $a_i$, and waves that leave the quadrature hybrid coupler are denoted by $b_i$. It holds that:

$$a_i = \underline{U}_{ein,i}/\sqrt{Z_L}\ a_i \underline{U}_{aus,i}/\sqrt{Z_L}$$

$Z_L$ IS the line impedance, the arriving and departing waves $\underline{U}_{ein,i}$, $\underline{U}_{aus,i}$ are also denoted as (impedance) normalized waves. The underscore shows that complex variables are involved. The resulting matrix notation is $$\underline{b} = \underline{S} \cdot \underline{a}$$

$\underline{S}$ is the scattering matrix. The scattering matrix of a 90° quadrature hybrid (3 dB quadrature hybrid coupler) is $$\underline{S}_{QH} = \frac{1}{\sqrt{2}} \begin{pmatrix} 0 & -j & -1 & 0 \\ -j & 0 & 0 & -1 \\ -1 & 0 & 0 & -j \\ 0 & -1 & -j & 0 \end{pmatrix}$$

The term 90° quadrature hybrid is derived from the behavior of the coupler when only one signal is fed in at the port TOR1. The signal at port TOR1 is then split between the ports TOR2 and TOR3, the phase shift of the two departing waves at the ports TOR2 and TOR4 being 90°.

In the case of the coupler 8 illustrated in FIG. 4, it is only at the ports TOR1 and TOR3 that waves coming from the two transmit amplifiers 5, 6 are fed in:

$$a = \begin{pmatrix} a_1 \\ 0 \\ 0 \\ a_4 \end{pmatrix}$$

The waves departing at the ports TOR2 and TOR3 are yielded as:

$b_2 = (-j\underline{a}-\underline{a}_4)/\sqrt{2} \ \ b_3 = (-\underline{a}_1 j\underline{a}_4)/\sqrt{2}$ Three operational modes can be distinguished on the basis of different amplitude and phase of the signals at the ports TOR1 and TOR4.

In the case of the first operational mode, the signals present at the ports TOR1 and TOR4 have the same amplitude and phase, and so $a_1 = a_4$. The following is then yielded:

$b_2 = (-a_1)(j+1)/\sqrt{2} \ \ b_3 = (-a_1)(1+j)/\sqrt{2}$

Consequently, two waves with the same amplitude and the same phase depart from the coupler 8 at the ports TOR2 and TOR3.

In the case of the second operational mode, the signals present at the ports TOR1 and TOR4 have the same amplitude, but a phase difference of 90°, and so $a_4 = ja_1$.

The following is then yielded:

$b_2 = (-2ja_1)/\sqrt{2} \ \ b_3 = 0$

The amplitude of the signal at port TOR2 is double, whereas no signal is output at port TOR3.

In the case of the third operational mode, the signals present at the ports TOR1 and TOR4 have the same amplitude, but a phase difference of −90° (or 270°), and so $a_4 = -ja_1$. The following is then yielded:

$b_2 = 0 \ \ b_3 = (-2ja_1)/\sqrt{2}$

The amplitude of the signal at port TOR3 is double, whereas no signal is output at the port TOR2.

Depending on the phase angle of the two signals present at the ports TOR1 and TOR4, it is therefore possible to split the power or to switch to and fro between the two ports TOR2 and TOR3. Similar conditions result in the case of a coupler 8 configured as magic T, the magic T being a 180° quadrature hybrid and differing in the scattering matrix.

Figure 5:
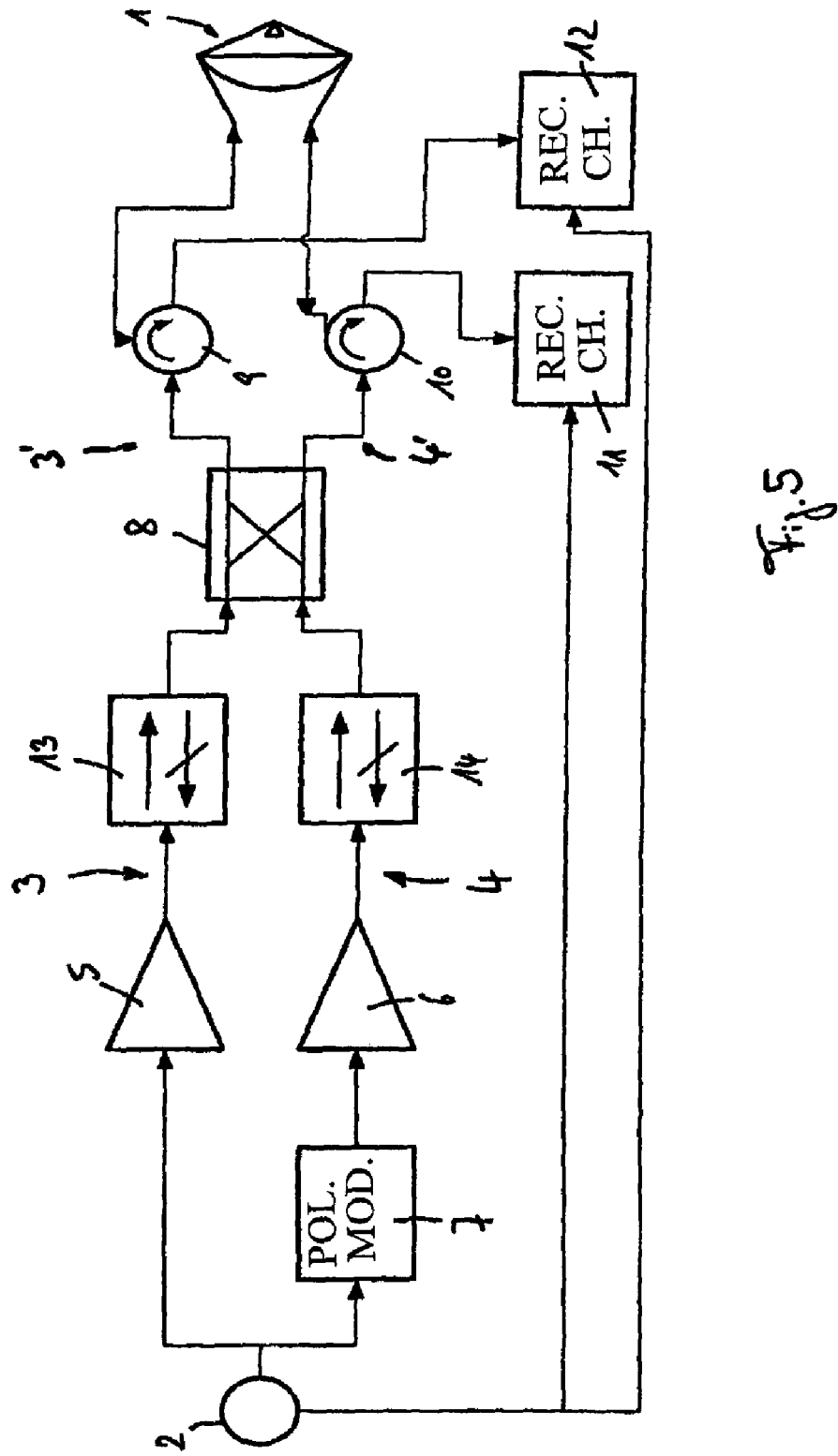
FIG. 5 shows a schematic of a weather radar with a second exemplary embodiment of a transmitter.

In the case of the exemplary embodiment illustrated in FIG. 5, an isolator 13 or 14, by means of which the transmit amplifiers 5, 6 are protected is arranged between the transmit amplifiers 5, 6 and the coupler 8 in the signal paths 3, 4, respectively. The isolators 13, 14 can be configured as one-way attenuators. For reasons of simplicity, the apparatus 23 for generating transmit signals, and the oscillator(s) 23 are not illustrated in FIG. 5. However, the exemplary embodiment illustrated in FIG. 5 can to this extent correspond to the exemplary embodiment illustrated in FIG. 1. It is likewise possible to use the inventive transmitter in a polarization modulated pulse compression radar or FMCW radar illustrated in FIG. 2 or FIG. 3, respectively.

Figure 6:
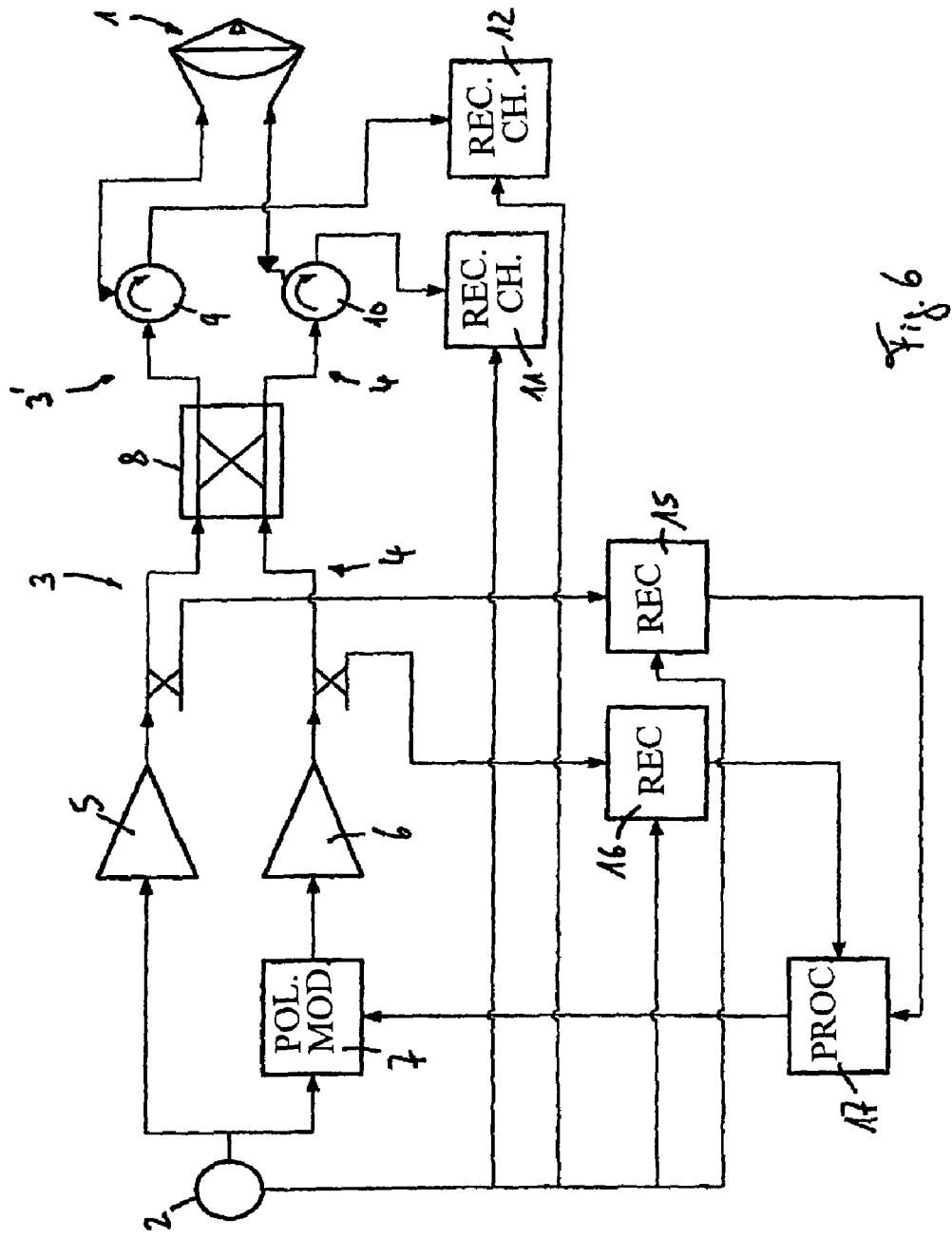
FIG. 6 shows a schematic of a weather radar with a third exemplary embodiment of a transmitter.

In the case of the exemplary embodiment illustrated in FIG. 6, a good quality is achieved for the transmit signals by virtue of the fact that the signals fed into the coupler 8 already exhibit a high correlation. This is achieved by decoupling a test signal from each signal path 3, 4. The decoupled test signal is fed in mixed fashion via a respective receiver 15, 16 to a processor 17 that calculates an optimum predistortion. The processor 17 is connected to a predistorter which is configured together with the phase modulator 7 and which it controls. Alternatively, the predistorter can be configured separately from the phase modulator. The receivers 15, 16 are connected to the generator 2 and receive a generator output signal as reference, and compare the signal decoupled from the signal paths 3, 4 with the reference such that the processor 17 controls the predistorter on the basis of the comparison. Alternatively, it can be provided that the signals of the signal paths 3, 4 are decoupled downstream of the coupler 8 in order to compensate any possible asymmetries of the coupler 8 by controlling the predistortion. It is likewise possible to decouple test signals both upstream and downstream of the coupler. For reasons of simplicity, the apparatus 23 for generating transmit signals, and the oscillator(s) 23 are not illustrated in FIG. 6. However, the exemplary embodiment illustrated in FIG. 6 can to this extent correspond to the exemplary embodiment illustrated in FIG. 1. It is likewise possible to use the inventive transmitter in a polarization modulated pulse compression radar or FMCW radar illustrated in FIG. 2 or FIG. 3, respectively.

Figure 7:
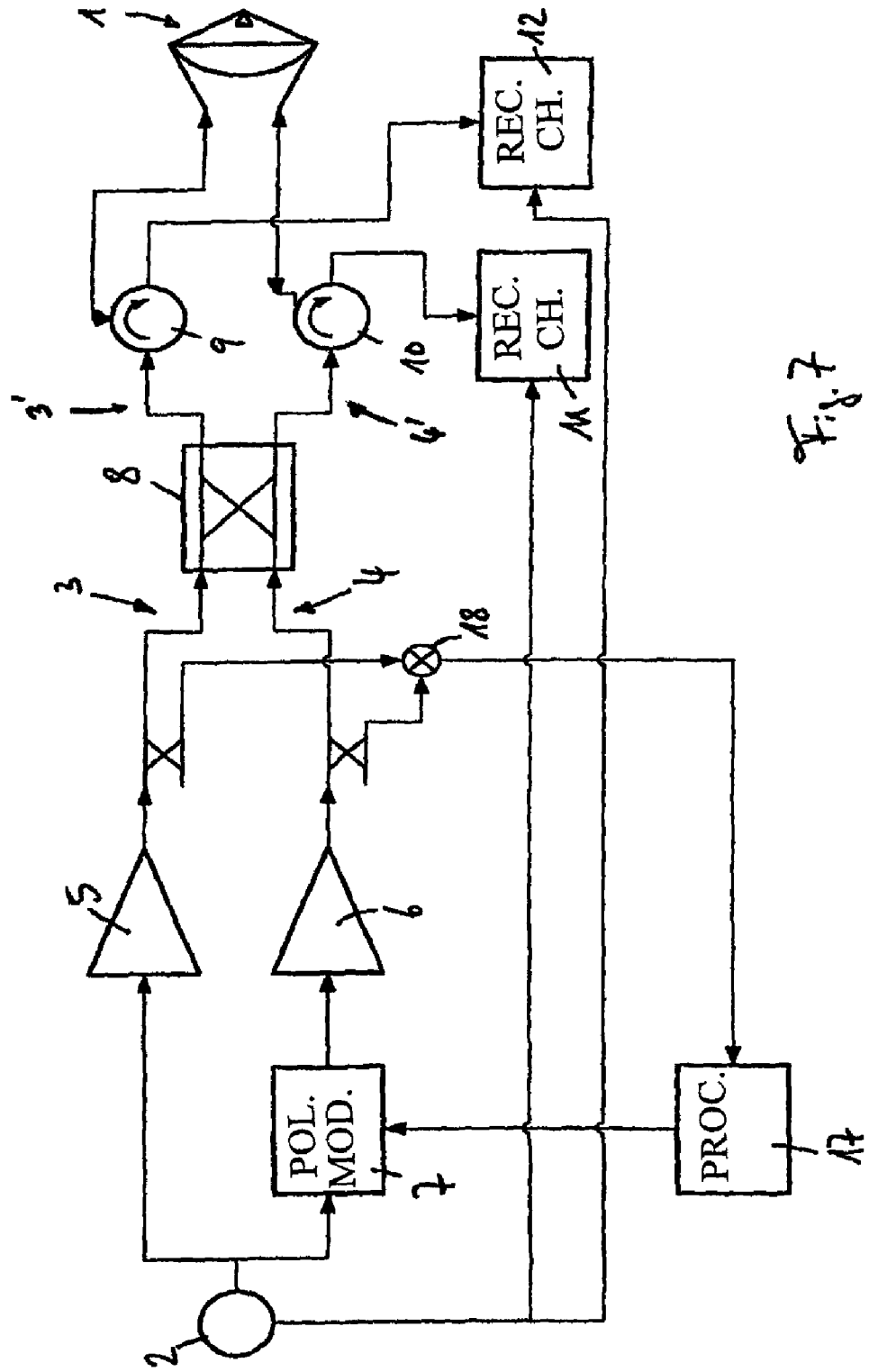
FIG. 7 shows a schematic of a weather radar with a fourth exemplary embodiment of a transmitter.

In the case of the exemplary embodiment illustrated in FIG. 7, the correlation between the two signals in the signal paths 3, 4 is achieved by mixing the decoupled signals in a mixer 18 and feeding them to the processor 17, in order to control the predistorter. Depending on the type of the mixer 18, one of the two signals from the signal paths can further be delayed via a calibrated phase shifter in order to maximize the output signal of the mixer 18. Here, as well, it can again be provided that the signals of the signal paths are decoupled downstream of the coupler 8 in order to compensate any possible asymmetries of the coupler 8 by controlling the predistortion. For reasons of simplicity, the apparatus 23 for generating transmit signals, and the oscillator(s) 23 are not illustrated in FIG. 7. However, the exemplary embodiment illustrated in FIG. 7 can to this extent correspond to the exemplary embodiment illustrated in FIG. 1. It is likewise possible to use the inventive transmitter in a polarization modulated pulse compression radar or FMCW radar illustrated in FIG. 2 or FIG. 3, respectively.

Figure 8:
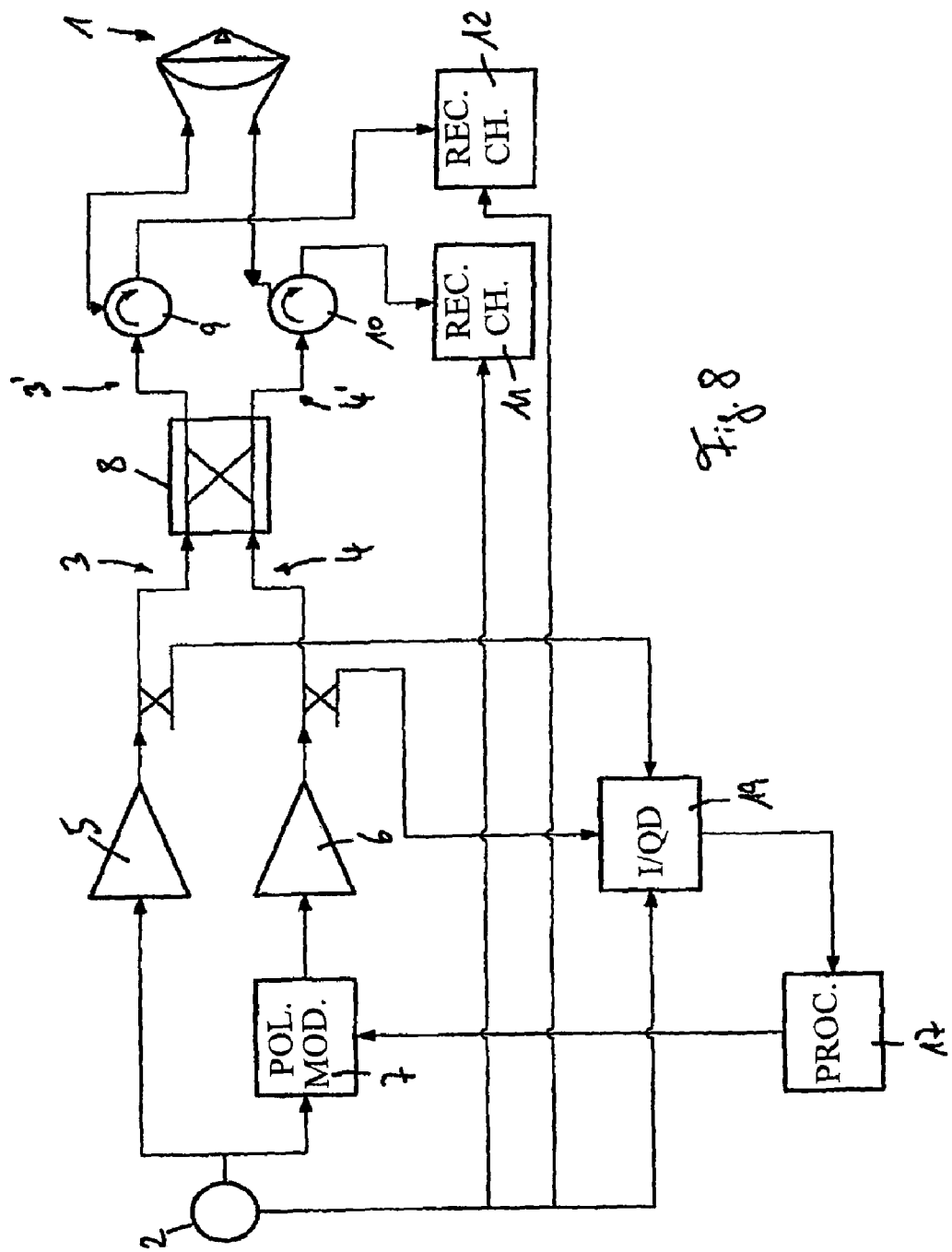
FIG. 8 shows a schematic of a weather radar with a fifth exemplary embodiment of a transmitter.

FIG. 8 illustrates an exemplary embodiment in which the correlation between the two signals in the signal paths 3, 4 is achieved via an I/Q demodulator 19 that is fed the decoupled signals of the signal paths 3, 4. Via a complex phasor, the I/Q demodulator 19 supplies the phase information and amplitude information as output signal to the processor 17, which controls the predistorter. For the purpose of evaluating the phase and amplitude information, the I/Q demodulator 19 receives a reference signal from the generator 2. The I/Q demodulator is preferably calibrated. For reasons of simplicity, the apparatus 23 for generating transmit signals, and the oscillator(s) 23 are not illustrated in FIG. 8. However, the exemplary embodiment illustrated in FIG. 8 can to this extent correspond to the exemplary embodiment illustrated in FIG. 1. It is likewise possible to use the inventive transmitter in a polarization modulator pulse compression radar or FMCW radar illustrated in FIG. 2 or FIG. 3, respectively.

The invention claimed is:

1. A polarization modulated transmitter, in particular for a weather radar, with at least two signal paths to which a radio frequency signal can be fed, and which are connected to a coupler, and with a phase modulation of the signal to be emitted via the antenna, characterized in that the same radio frequency signal can be fed to the at least two signal paths respectively having at least one transmit amplifier, and a polarization modulator is arranged for the phase modulation in one of the at least two signal paths in such a way that a radio frequency signal can first be phase modulated and then amplified.

2. The transmitter as claimed in claim 1, characterized in that the radio frequency signal can be fed by a pulse modulator.

3. The transmitter as claimed in claim 1, characterized in that the polarization modulator is a phase shifter.

4. The transmitter as claimed in claim 1, characterized in that the coupler is a magic T or a hybrid.

5. The transmitter as claimed in claim 1, characterized in that the coupler is a branch-line coupler or a hybrid ring coupler.

6. The transmitter as claimed in claim 1, characterized in that the transmit amplifiers are designed as a klystron, crossed field amplifier, traveling field tube, grid-controlled tube or transistor amplifier.

7. The transmitter as claimed in claim 1, characterized in that an isolator is respectively arranged between the transmit amplifiers and the coupler in the signal paths.

8. A polarization modulated transmitter, in particular for a weather radar, with at least two signal paths to which a radio frequency signal can be fed, and which are connected to a coupler, and with a phase modulation of the signal to be emitted via the antenna, characterized in that the same radio frequency signal can be fed to the at least two signal paths respectively having at least one transmit amplifier, and a polarization modulator is arranged for the phase modulation in one of the at least two signal paths in such a way that a radio frequency signal can first be phase modulated and then amplified, and further characterized in that the signal of the signal paths can be decoupled to receivers that are connected to a processor that can be used to control at least one predistorter, arranged in a signal path upstream of the transmit amplifier, and/or the phase modulator with regard to the predistortion and/or phase modulation of one of the signals of the signal paths.

9. The transmitter as claimed in claim 8, characterized in that the receivers are respectively coupled to the pulse modulator in order to receive a reference signal.

10. The transmitter as claimed in claim 8, characterized in that a mixer that can be coupled between the two signal paths and the processor is provided in order to control the predistorter and/or phase modulator as a function of the mixed signal.

11. The transmitter as claimed in claim 8, characterized in that there is provided for obtaining the phase and amplitude information of the signals of the signal paths an I/Q demodulator that can be coupled between the two signal paths and the processor in order to control the predistorter and/or phase modulator.

12. A polarization modulated transmitter for a weather radar system, comprising:
at least two signal paths that are each fed a radio frequency to be transmitted via an antenna, the radio frequency signal fed to each signal path being the same radio frequency signal;
a polarization modulator at one of the signal paths for phase modulating the signal on that signal path;
a transmit amplifier at the one of the signal paths, the transmit amplifier arranged so that the radio frequency signal on that signal path is phase modulated and then amplified; and
a coupler for receiving the radio frequency signal on each of the signal paths and providing the radio frequency signal from each of the signal paths for transmission via the antenna.

* * * * *